US007679213B2

(12) United States Patent
Mino

(10) Patent No.: US 7,679,213 B2
(45) Date of Patent: Mar. 16, 2010

(54) AC TO DC CONVERTER CIRCUIT

(75) Inventor: Kazuaki Mino, Hino (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 404 days.

(21) Appl. No.: 11/520,683

(22) Filed: Sep. 14, 2006

(65) Prior Publication Data

US 2007/0069581 A1 Mar. 29, 2007

(30) Foreign Application Priority Data

Sep. 29, 2005 (JP) ............................. 2005-283755

(51) Int. Cl.
H02M 3/335 (2006.01)
(52) U.S. Cl. .................... 307/31; 307/151; 363/21.06
(58) Field of Classification Search .................. 363/71, 363/17, 89, 108, 125, 126, 127, 90, 97, 21.06; 323/282; 307/31, 151
See application file for complete search history.

(56) References Cited

U.S. PATENT DOCUMENTS

| 4,517,633 | A | * | 5/1985 | Melcher | 363/21.04 |
| 5,933,049 | A | * | 8/1999 | Melse | 363/21.13 |
| 6,222,747 | B1 | * | 4/2001 | Rinne et al. | 363/89 |
| 6,501,193 | B1 | * | 12/2002 | Krugly | 307/31 |
| 6,552,917 | B1 | * | 4/2003 | Bourdillon | 363/21.12 |
| 6,642,630 | B2 | * | 11/2003 | Watanabe | 307/31 |
| 7,304,867 | B2 | * | 12/2007 | Usui | 363/21.06 |
| 2005/0068796 | A1 | * | 3/2005 | Morita | 363/120 |
| 2006/0076940 | A1 | * | 4/2006 | Kawabata | 323/282 |

FOREIGN PATENT DOCUMENTS

| JP | 2001-025240 | 1/2001 |
| JP | 2003-188032 | 7/2003 |

OTHER PUBLICATIONS

Spiazzi et al., Utility interface issues of power electronic converters, 1996, IAS Annual Meeting.*
Hui et al., Paralleling power converters for AC-DC step-down power conversion with iherent power factor correction, Mar. 1999, IEE Proc.-Electr. Power Appl., vol. 146, No. 2.*

* cited by examiner

Primary Examiner—Albert W Paladini
Assistant Examiner—Daniel Cavallari
(74) Attorney, Agent, or Firm—Manabu Kanesaka

(57) ABSTRACT

An AC to DC converter circuit includes a main circuit including a first circuit and a second circuit connected to an AC power supply in parallel to each other, the first circuit including diodes and a switching device, the second circuit including diodes and a switching device. The switching devices are controlled to be ON and OFF corresponding to the input voltage polarity discriminated with an input voltage polarity discriminator such that two DC outputs are obtained from one AC power supply. The AC to DC converter circuit reduces the semiconductor devices, through which a current flows, facilitates reducing the losses caused therein, improving the conversion efficiency thereof, and reducing the size, weight and manufacturing costs of the cooling means thereof.

6 Claims, 9 Drawing Sheets

AC TO DC CONVERTER CIRCUIT

BACKGROUND OF THE INVENTION AND RELATED ART STATEMENT

The present invention relates to an AC to DC converter circuit that obtains DC electric power from an AC power supply while controlling an input current efficiently.

FIG. 9 is a block circuit diagram describing a conventional AC to DC converter circuit including a power factor improving circuit as described in Japanese Patent Publication No. 2005-110434 and a DC to DC converter circuit. FIG. 10 is a wave chart describing the operations of the conventional AC to DC converter circuit.

In FIG. 9, an AC power supply 1; coils 2, 26; diodes 4, 7 through 10, 15 through 18; switching devices 20, 22, 23; capacitors 30, 32; and a transformer 40 are shown. The power factor improving circuit is formed of a rectifying circuit, including diodes 15 through 18, and switching device 20. The DC to DC converter circuit is formed of a converter circuit including diodes 7, 8 and switching devices 22, 23 and a rectifying and smoothing circuit including diodes 9, 10 and capacitor 32.

As switching device 20 turns ON when the voltage $V_{in}$ of AC power supply 1 is positive, a current flows from AC power supply 1 to AC power supply 1 via diode 15, coil 2, switching device 20, and diode 18, increasing the current $i_2$ of coil 2. As switching device 20 turns OFF, a current flows from coil 2 to coil 2 via diode 4, capacitor 30, diode 18, AC power supply 1, and diode 15, decreasing the current $i_2$. When the voltage $V_{in}$ is negative, diodes 15 and 17 are electrically conductive, resulting in the same operations as described above. Therefore, by driving the switching device 20 with an appropriate gate signal, the input current is controlled to be sinusoidal at a high power factor and a DC voltage is obtained between both ends of capacitor 30.

The DC voltage obtained as described above is higher than the input voltage amplitude. Therefore, it is necessary to dispose the DC to DC converter circuit considering the occasion, in which it is necessary to obtain a voltage lower than the input voltage amplitude or the occasion, in which a small high-frequency transformer is used for the insulation from the AC input side. As switching devices 22 and 23 turn ON, the voltage of capacitor 30 is applied to transformer 40 via switching devices 22 and 23. Since a similar voltage proportional to the transformation ratio of the transformer is generated on the secondary side of transformer 40, the current $i_{26}$ of coil 26 increases. As switching devices 22 and 23 turn OFF, the excitation energy stored in transformer 40 is regenerated to capacitor 30 via diodes 7 and 8, generating a reverse voltage in the transformer. The current $i_{26}$ decreases while circulating from coil 26 to coil 26 via capacitor 32 and diode 10. Therefore, a desired DC voltage insulated is obtained by appropriately selecting the control signal pulse width for controlling switching devices 22 and 23 and the transformer turn ratio.

In the power factor improving circuit in FIG. 9, a current flows always through three semiconductor devices and conduction losses are caused in the semiconductor devices, resulting in large losses. In order to suppress the temperature rise caused by the generated losses, cooling means is required, and volume and costs for cooling means increases.

Therefore, it would be desirable to provide an AC to DC converter circuit that facilitates decreasing the number of semiconductor devices, through which a current flows, reducing the losses caused, improving the conversion efficiency, reducing the cooling means size, and reducing the manufacturing costs of the cooling means.

The capacitance on the output side of the DC to DC converter circuit (capacitor 32) is determined such that current ripples and voltage ripples are allowable. Therefore, the current ripples and the voltage ripples not only increase the volume and costs of the electrolytic capacitor connected to the output side but also shorten the life of the AC to DC converter circuit. The ripple component in the output voltage causes adverse effects such as malfunction or breakdown of the apparatus connected to the load.

Therefore, it would be also desirable to provide an AC to DC converter circuit that facilitates reducing the ripple current and the ripple voltage caused in the electrolytic capacitor, using a small and inexpensive electrolytic capacitor, elongating the life thereof, and providing the output voltage with an excellent quality.

SUMMARY OF THE INVENTION

According to a first aspect of the invention, there is provided an AC to DC converter circuit that obtains a plurality 2N of DC outputs from an AC power supply, the N being a nonnegative integer. The AC to DC converter circuit comprises a pair of AC input terminals; 2N pairs of DC output terminals corresponding to the 2N DC outputs; 2N series circuits connected between the AC input terminals, each of the series circuits including a first diode and a switching device; the connection point of the first diode and one end of the switching device in each of the series circuits being connected to one of the pairing DC output terminals for the series circuit via a second diode; and the other end of the switching device being connected to the other one of the pairing DC output terminals for the series circuit.

According to a second aspect of the invention, there is provided an AC to DC converter circuit that obtains a plurality 2N of DC outputs from an AC power supply, the N being a nonnegative integer. The AC to DC converter circuit comprises a pair of AC input terminals; 2N pairs of DC output terminals corresponding to the 2N DC outputs; 2N series circuits connected between the AC input terminals, each of the series circuits including a first diode and a switching device, one end thereof being connected to the first diode; one end of each of the series circuits being connected to one of the pairing DC output terminals for the series circuit via a second diode; and the other end of the switching device being connected to the other one of the pairing DC output terminals for the series circuit.

In the AC to DC converter circuit described in the second aspect, the switching device is provided with a capability of blocking the current flow in the reverse direction (hereinafter referred to as a "reverse current blocking capability") so that the first diode connected in series to the switching device may be omitted without problem (third aspect).

In the AC to DC converter circuit described in any of the first to third aspects, the respective switching devices in the 2N series circuits are controlled with a same signal (fourth aspect).

In the AC to DC converter circuit described in any of the first to fourth aspects, the AC to DC converter circuit further includes DC to DC converter circuits connected to the respective 2N pairs of DC output terminals; the output terminal pairs of the respective DC to DC converter circuits being connected in parallel to each other; and the phases of the control signals controlling the respective DC to DC converter circuits being made to be different from each other (fifth aspect).

In the AC to DC converter circuit described in any of the first to fourth aspects, the AC to DC converter circuit further includes DC to DC converter circuits connected to the respective 2N pairs of DC output terminals; the output terminal pairs of the respective DC to DC converter circuits being connected in series to each other; and the phases of the control signals controlling the respective DC to DC converter circuits being made to be different from each other (sixth aspect).

Since the semiconductor devices, through which a current flows, are decreased according to the invention, the conversion efficiency of the AC to DC converter circuit according to the invention is improved. By combining the DC to DC converter circuits with the AC to DC converter circuit, ripple currents and ripple voltages are reduced. Therefore, the AC to DC converter circuit according to the invention facilitates reducing the size and manufacturing costs, improving the performances and elongating the life thereof.

DETAILED DESCRIPTION OF PREFERRED EMBODIMENTS

Now, the invention will be described in detail hereinafter with reference to the accompanied drawings which illustrate the preferred embodiments of the invention.

Figure 1:
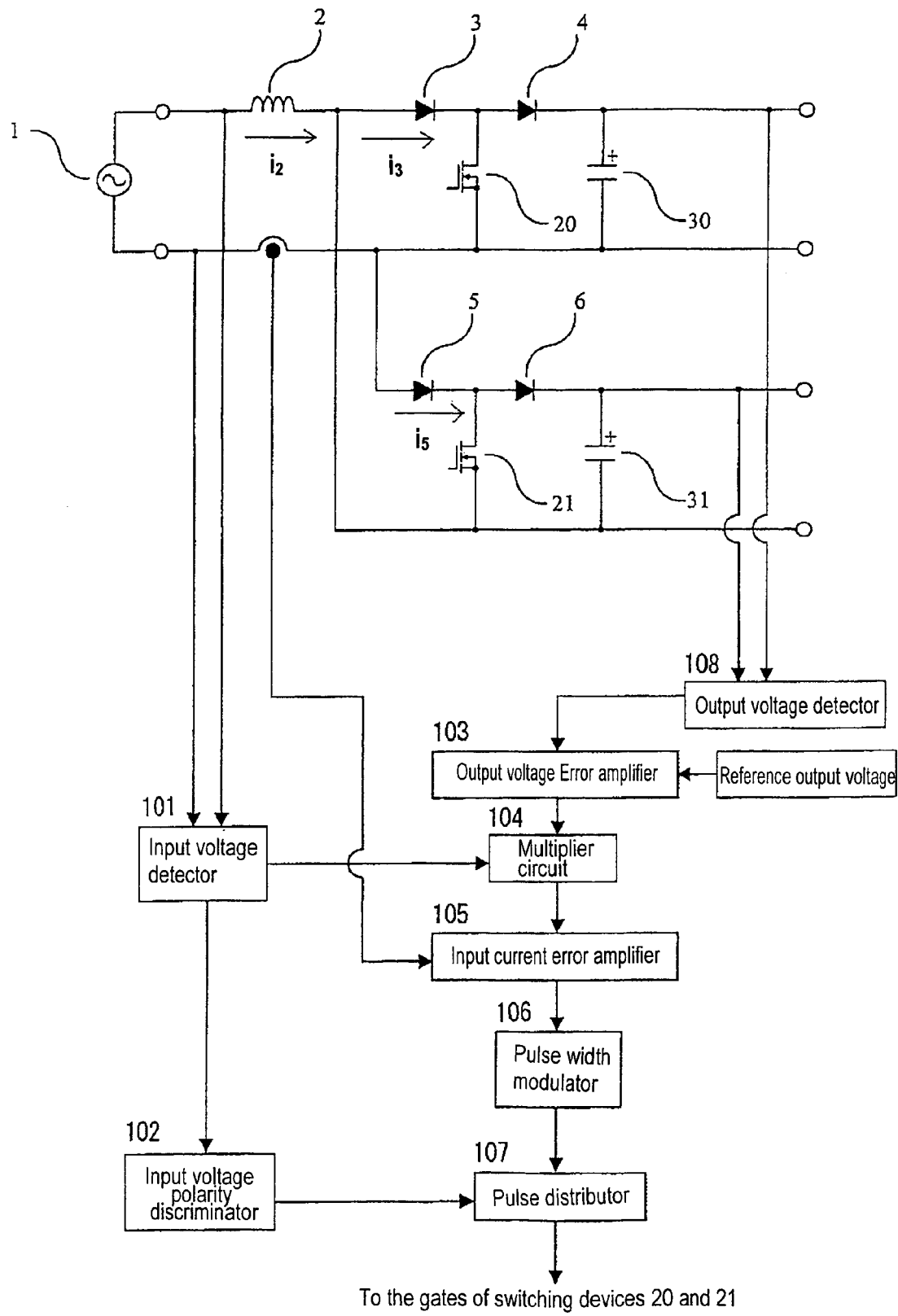
FIG. 1 is a block diagram of an AC to DC converter circuit according to a first embodiment of the invention.
Figure 2:
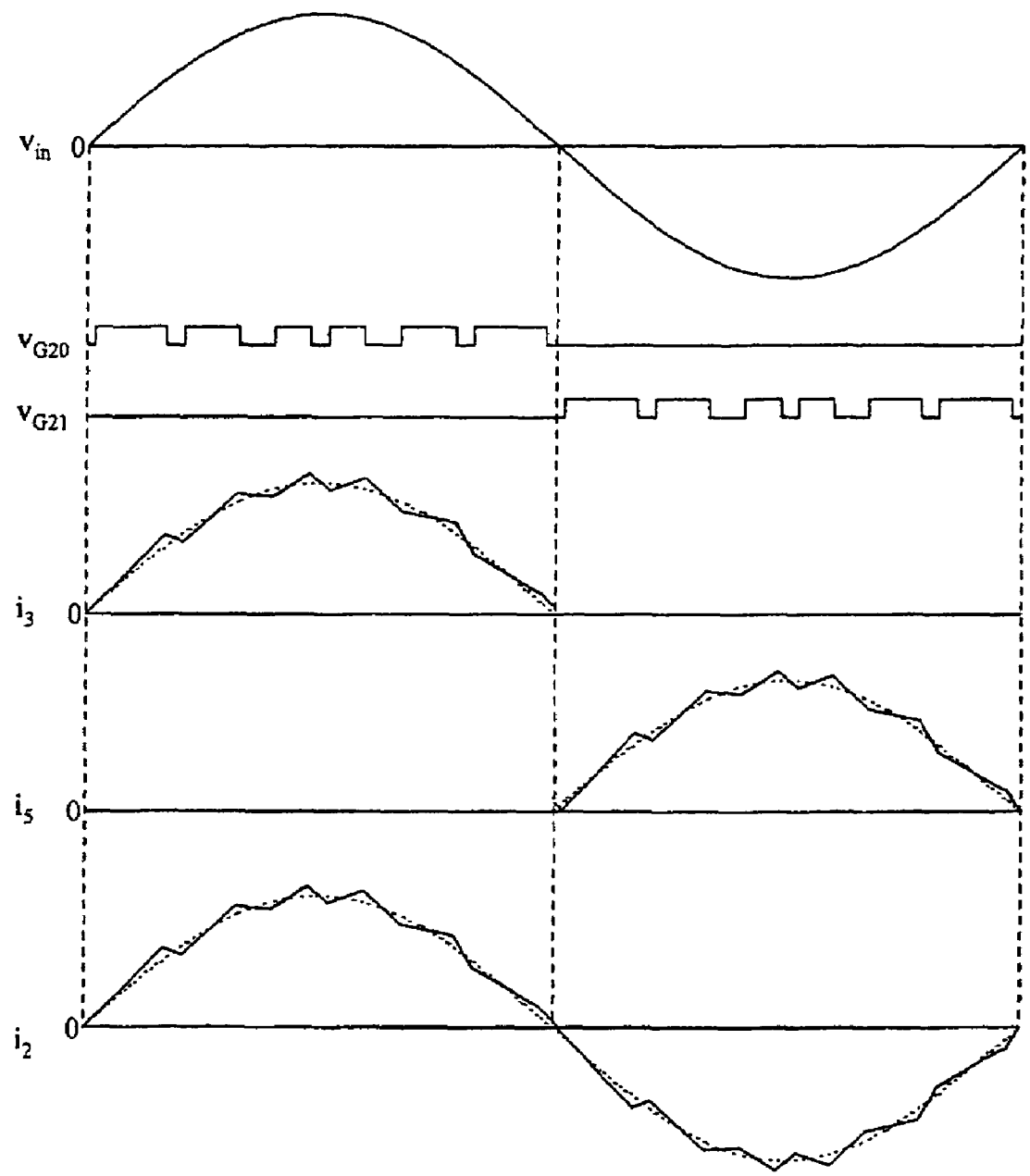
FIG. 2 is a wave chart describing the operations of the AC to DC converter circuit shown in FIG. 1.

FIG. 1 is a block diagram of an AC to DC converter circuit according to the first embodiment of the invention. The AC to DC converter circuit shown in FIG. 1 obtains two DC outputs. Generally, the AC to DC converter circuit according to the invention facilitates obtaining 2N DC outputs, wherein N is a nonnegative integer. FIG. 2 is a wave chart describing the operations of the AC to DC converter circuit shown in FIG. 1.

Referring now to FIG. 1, a main circuit includes a first circuit having diodes 3, 4 and a switching device 20, and a second circuit including diodes 5, 6 and a switching device 21. The first and second circuits are connected to an AC power supply 1 in parallel to each other. In the first circuit, a series circuit of diode 3 and switching device 20 is connected between a pair of AC input terminals, and diode 4 is connected between the connection point of diode 3 and switching device 20 and a DC output terminal. In the second circuit, diodes 5, 6 and switching device 21 are connected in the same manner as in the first circuit. Desired voltages are generated across capacitors 30 and 31, respectively, by driving the first and second circuits under the control described later so that two DC outputs may be obtained from one AC power supply.

The control section for controlling the main circuit described above includes an input voltage detector 101, an input voltage polarity discriminator 102, an output voltage error amplifier 103, a multiplier circuit 104, an input current error amplifier 105, a pulse width modulator 106, a pulse distributor 107, and an output voltage detector 108.

In addition, $V_{G20}$ and $V_{G21}$ are gate signals of switching devices 20 and 21 in FIG. 2.

An input voltage is detected by input voltage detector 101 and the polarity thereof is discriminated by input voltage polarity discriminator 102. Two output voltages from the first and second circuits are detected by output voltage detector 108 and controlled in output voltage error amplifier 103 so that the detected output voltages may be equal to the reference value thereof. The input voltage detected by input voltage detector 101 is multiplied in multiplier circuit 104 by the output from output voltage error amplifier 103 and adjusted to have a predetermined amplitude. The output from multiplier circuit 104 and the input current detected via a current transformer are fed to input current error amplifier 105 to generate a reference signal for controlling the input current to be sinusoidal. A PWM signal having a pulse width corresponding to the output signal from input current error amplifier 105 is generated in pulse width modulator 106. The PWM signal is forwarded to switching device 20 or 21 for the gate signal thereof depending on the polarity of the input voltage.

In the circuit configuration described above, the control section drives switching device 20 while the voltage of AC power supply 1 is positive, and switching device 21 while the voltage of AC power supply 1 is negative. As switching device 20 turns ON while the voltage of AC power supply 1 is positive, a current flows from AC power supply 1 to AC power supply 1 via coil 2, diode 3, and switching device 20, increasing the current $i_3$ of diode 3 and the current $i_2$ of coil 2 (cf. FIG. 2). As switching device 20 turns OFF while the voltage of AC power supply 1 is positive, a current flows from coil 2 to coil 2 via diode 3, diode 4, capacitor 30, and AC power supply 1, decreasing the current $i_3$ of diode 3 and the current $i_2$ of coil 2.

By driving switching device 21 while the voltage of AC power supply 1 is negative, operations similar to those described above are conducted. Thus, the AC to DC converter circuit shown in FIG. 1 converts the AC voltage to two DC voltages while controlling the input current to be sinusoidal. Since the number of the semiconductor devices, through which the current flows, is always 2, the loses caused in the converter circuit are reduced.

A third circuit and a fourth circuit (both not shown), both having the configuration same with that of the first and second circuits, may be connected to the AC input terminal pair. The first and third circuits may be driven in the same phase. And, the second and fourth circuits may be driven in the same phase. If the circuits connected in parallel to each other are increased, the circuits may be driven in the same manner as described above without problem.

Figure 3:
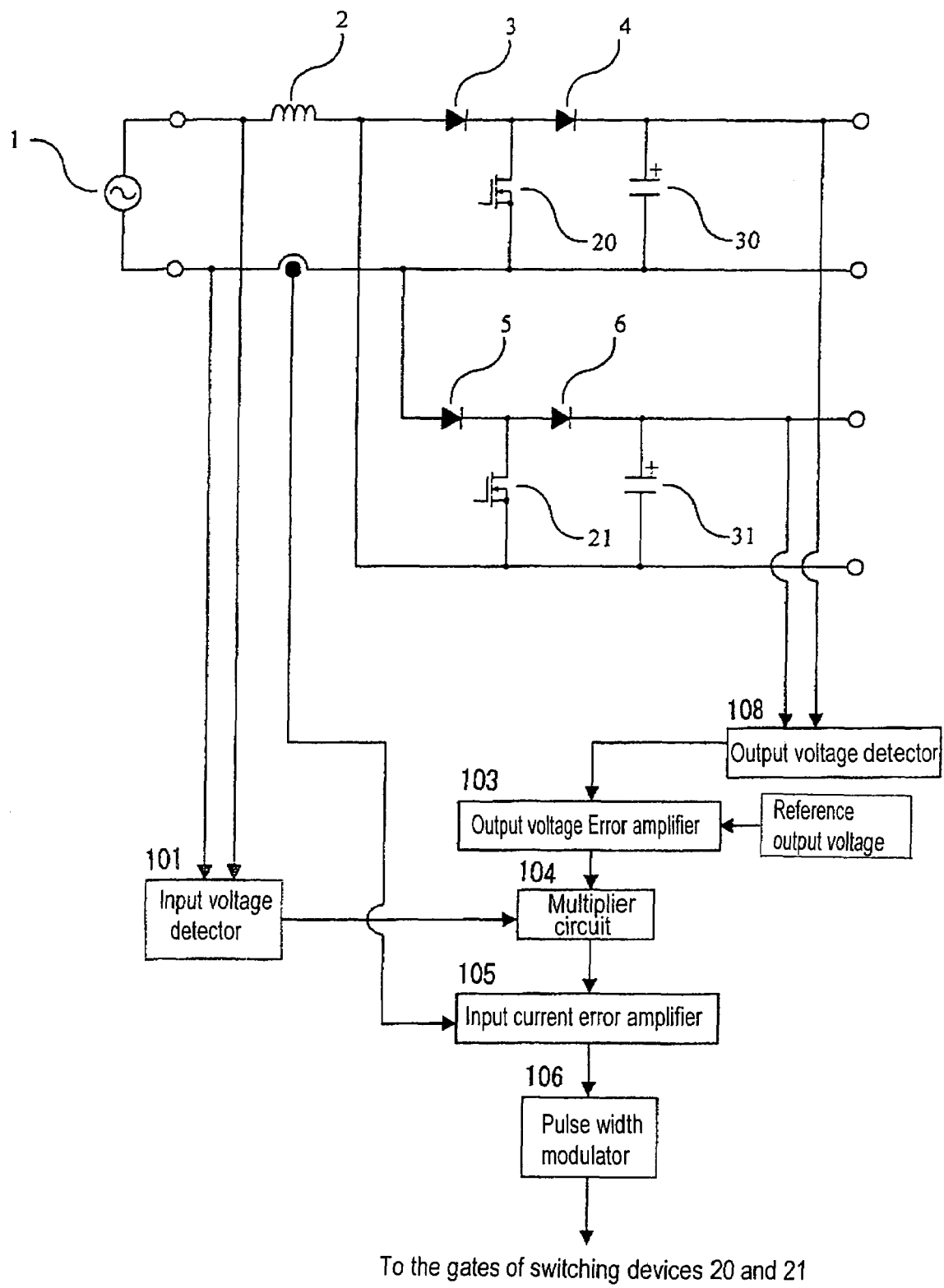
FIG. 3 is a block diagram of an AC to DC converter circuit according to a second embodiment of the invention.
Figure 4:
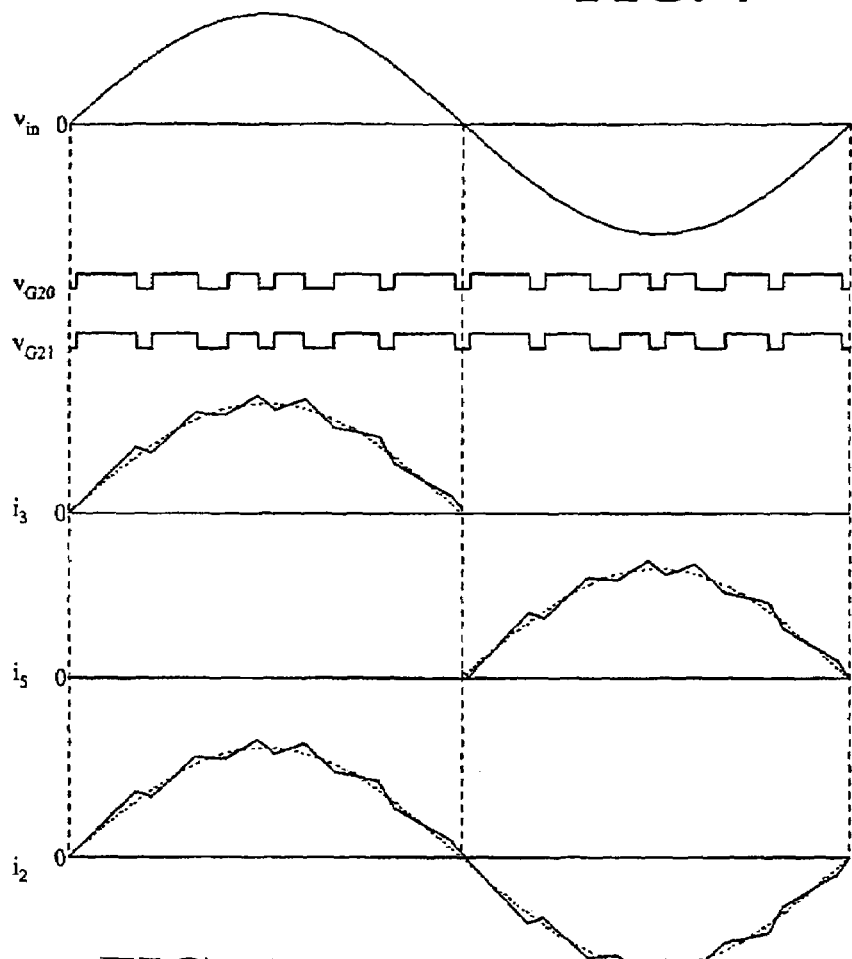
FIG. 4 is a wave chart describing the operations of the AC to DC converter circuit shown in FIG. 3.

FIG. 3 is a block diagram of an AC to DC converter circuit according to the second embodiment of the invention. FIG. 4 is a wave chart describing the operations of the AC to DC converter circuit shown in FIG. 4.

The AC to DC converter circuit according to the second embodiment is a modification of the AC to DC converter circuit according to the first embodiment.

The main circuit configuration in the AC to DC converter circuit in FIG. 3 is the same as the main circuit configuration in the AC to DC converter circuit in FIG. 1. According to the second embodiment, the control circuit is simplified. In detail, a same signal is used for the drive signals (gate signals) $v_{G20}$ and $v_{G21}$, described in FIG. 4 for driving switching devices 20 and 21, respectively. And, input voltage polarity discriminator 102 and pulse distributor 107 are omitted from the control section described in FIG. 1. Since it is possible to block the current with diode 5 when the voltage of power supply 1 is positive and with diode 3 when the voltage of power supply 1 is negative, it is not necessary to change over the control signals depending on the power supply voltage polarity. Therefore, it is possible to simplify the control circuit as described above.

Figure 11:
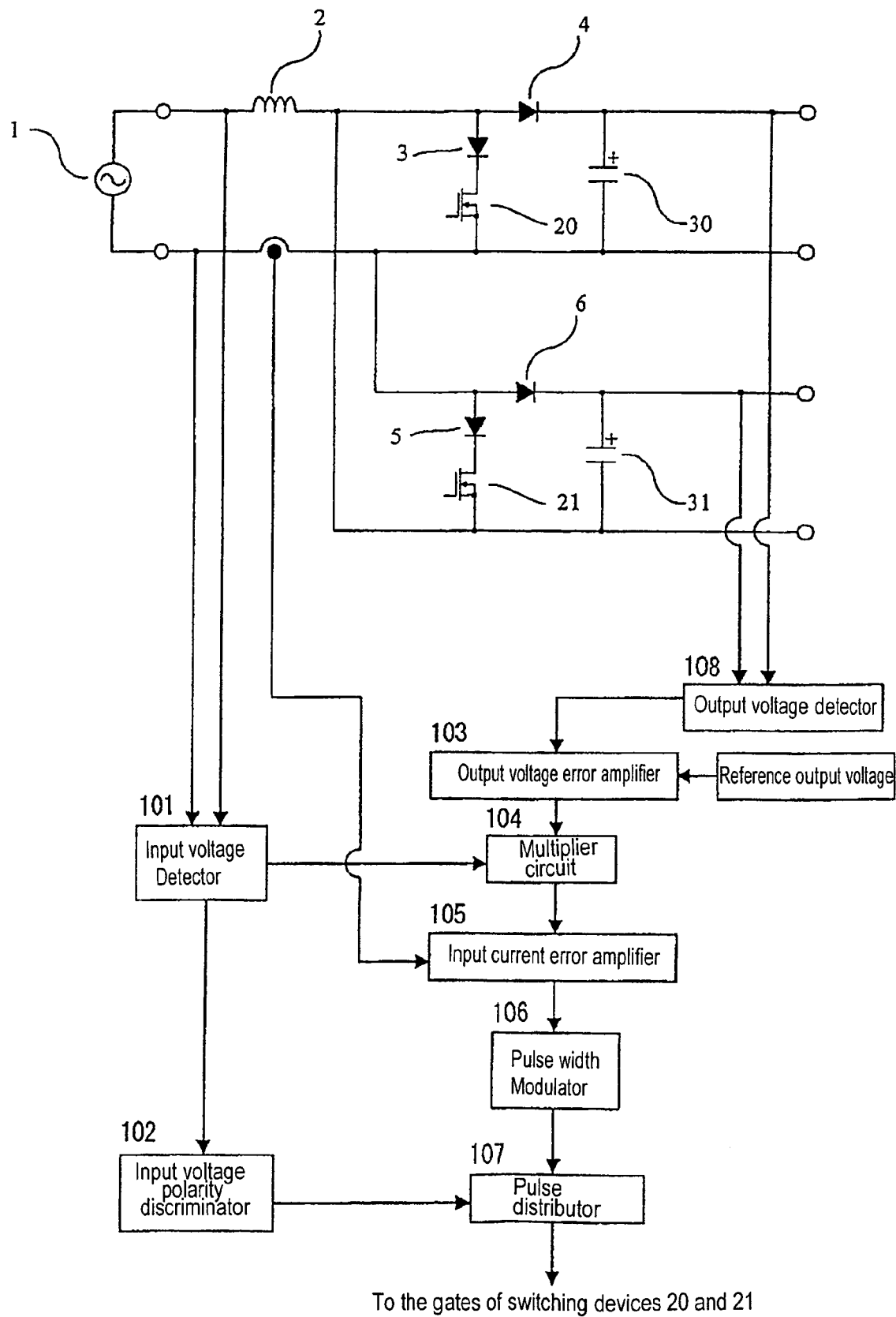
FIGS. 11 and 12 are block diagrams of the AC to DC converter circuit according to further embodiments of the invention.
Figure 12:
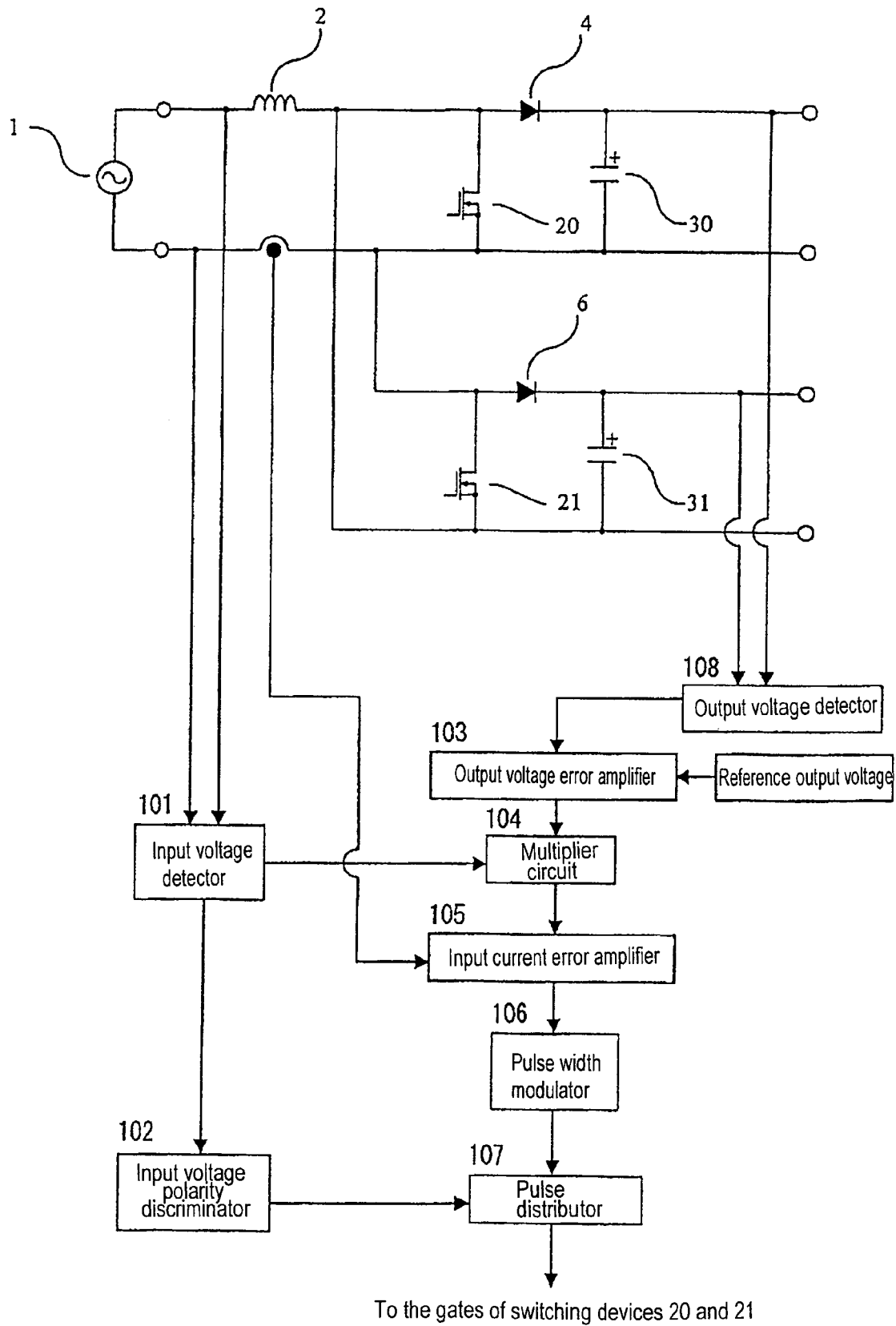

Based on the above description, diodes 3 and 5 for current blocking may be inserted in series to switching devices 20 and 21, respectively, without problem (FIG. 11). In detail, a series circuit of diode 3 and switching device 20 is connected between the AC input terminals, and diode 4 is connected between the series circuit of diode 3 and switching device 20 and capacitor 30. The positions of the diode 3 and the switching device 20 may be exchanged. Diodes 5, 6 and switching devices 21 are connected in the similar manner as described above. Moreover, diodes 3 and 5 may be omitted without problem by providing switching devices 20 and 21 with a reverse current blocking capability (FIG. 12).

Figure 5:
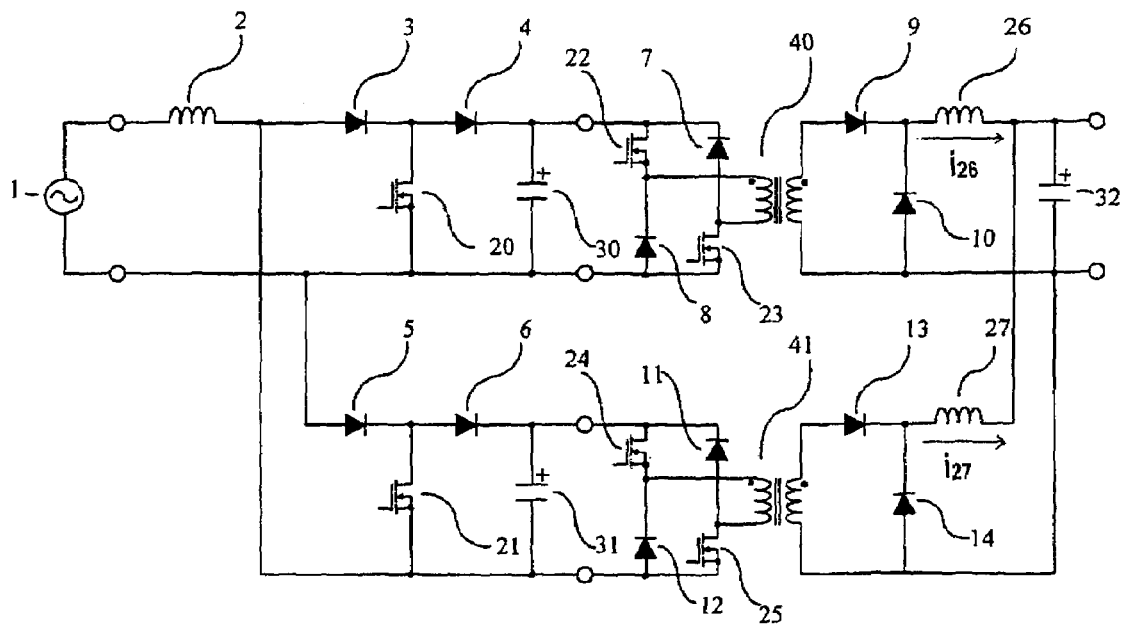
FIG. 5 is a block diagram of an AC to DC converter circuit according to a third embodiment of the invention.
Figure 6:
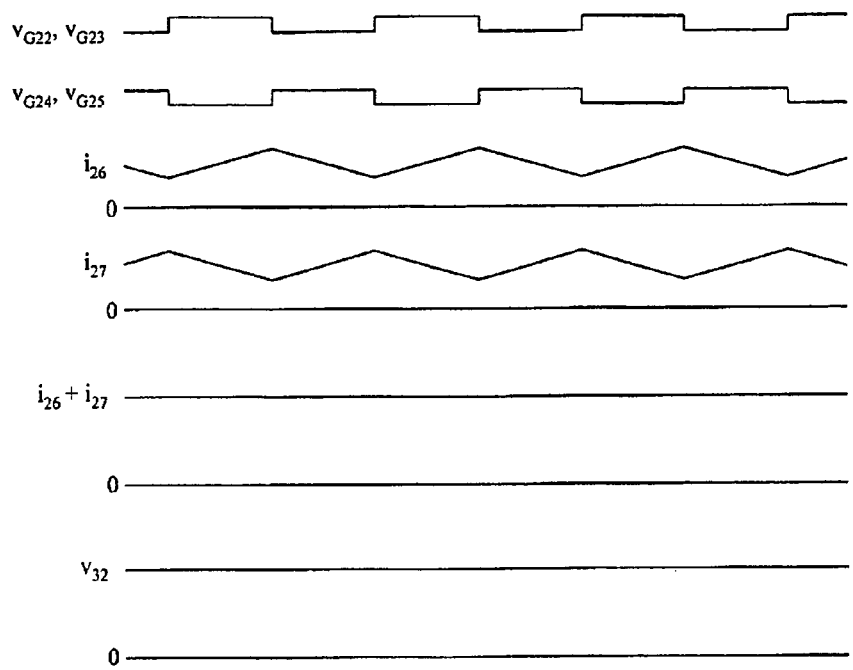
FIG. 6 is a wave chart describing the operations of the AC to DC converter circuit shown in FIG. 5.

FIG. 5 is a block diagram of an AC to DC converter circuit according to the third embodiment of the invention. FIG. 6 is a wave chart describing the operations of the AC to DC converter circuit shown in FIG. 5.

The AC to DC converter circuit according to the third embodiment includes DC to DC converter circuits connected to the respective DC output terminal pairs of the AC to DC converter circuit shown in FIG. 1, and the output terminal pairs of the DC to DC converter circuits are connected in parallel to each other. The DC to DC converter circuits operate in the same manner as the conventional DC to DC converter circuit. However, the phase of the control signal fed to switching devices 22 and 23 is made to be different from the phase of the control signal fed to switching devices 24 and 25. If the phase difference is, for example, 180° as described in FIG. 6, the current $i_{26}$ of coil 26 will increase and the current $i_{27}$ of coil 27 will decrease, when switching devices 22, 23 are ON and switching devices 24, 25 are OFF. Since the ripple current flowing through electrolytic capacitor 32 is the sum of the AC components in $i_{26}$ and $i_{27}$, the ripple current decreases and the ripples on the output voltage $v_{32}$ also decrease.

Figure 7:
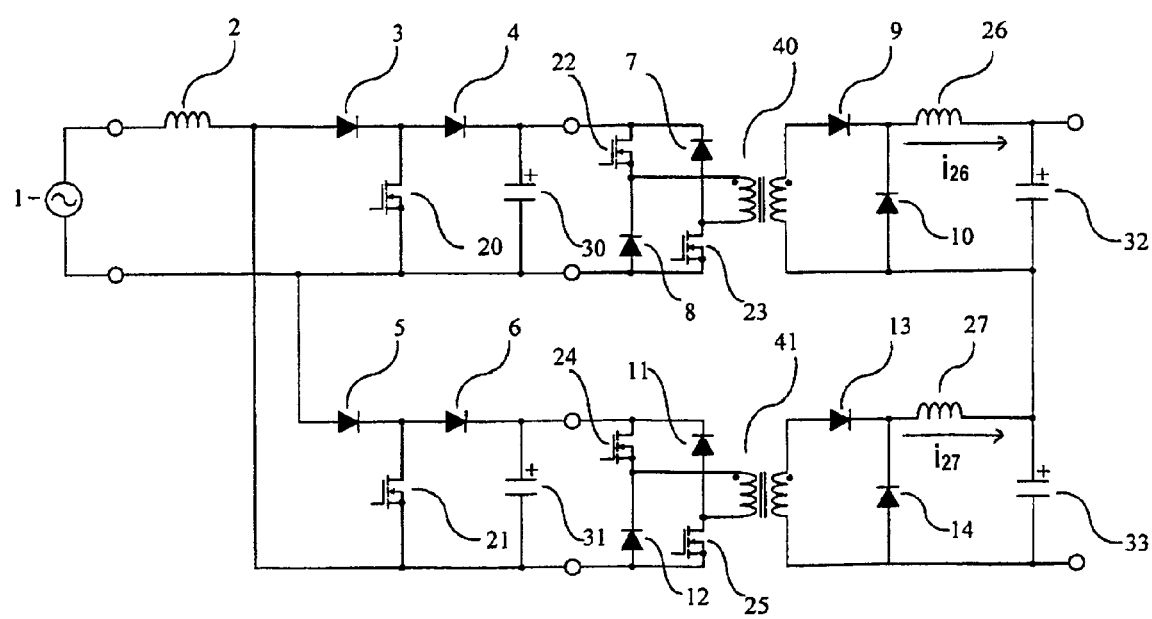
FIG. 7 is a block diagram of an AC to DC converter circuit according to a fourth embodiment of the invention.
Figure 8:
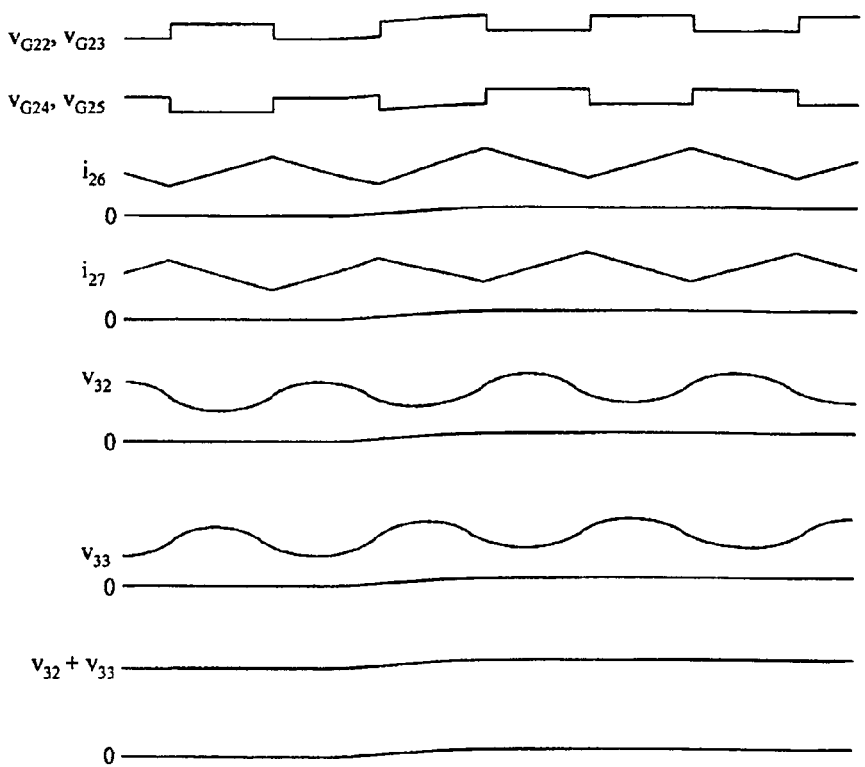
FIG. 8 is a wave chart describing the operations of the AC to DC converter circuit shown in FIG. 7.
Figure 9:
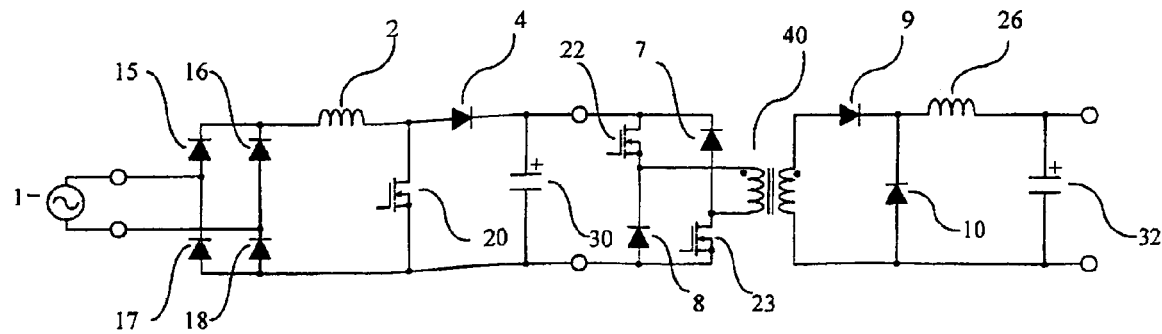
FIG. 9 is a block circuit diagram of a conventional AC to DC converter circuit.
Figure 10:
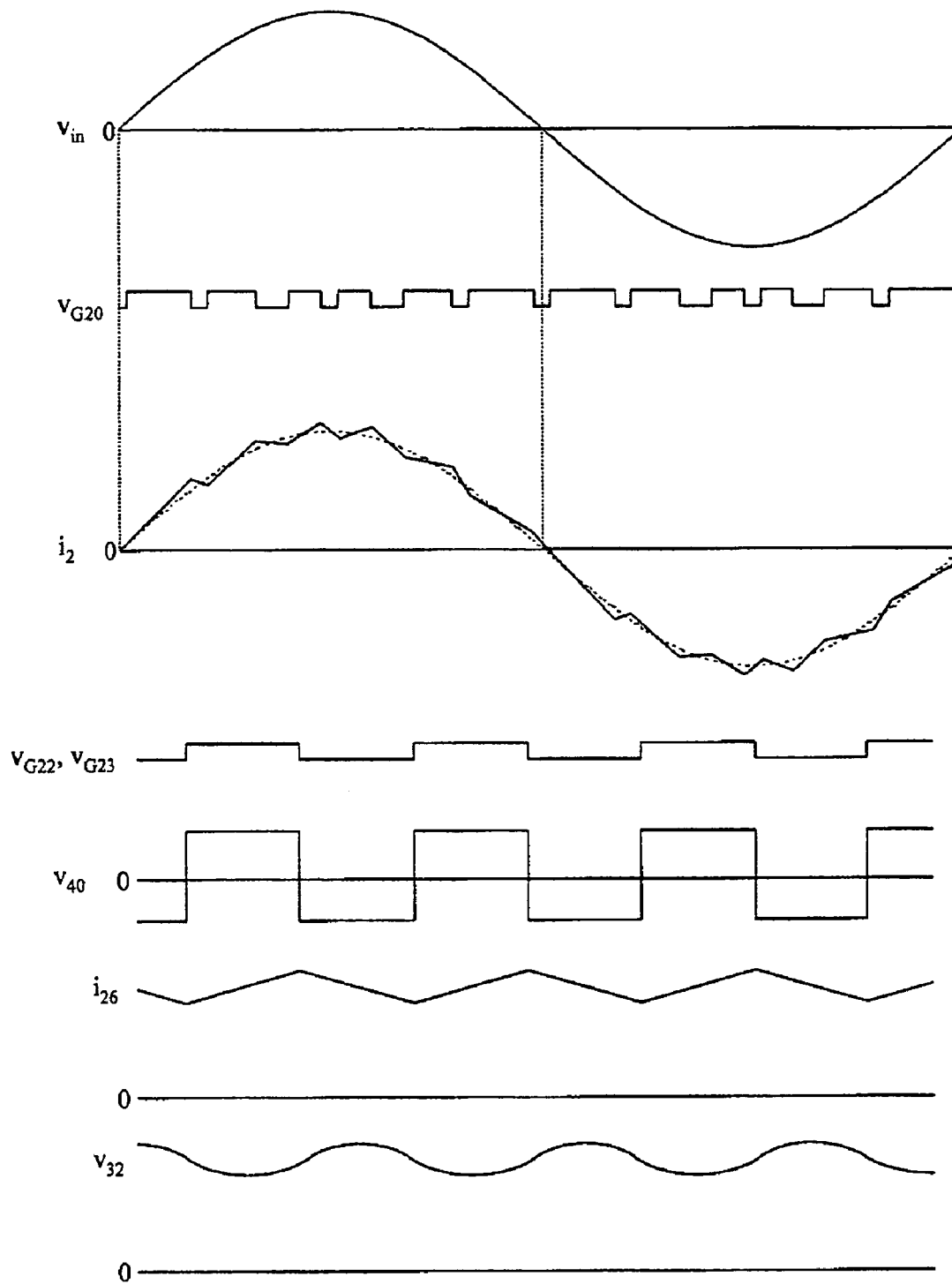
FIG. 10 is a wave chart describing the operations of the conventional AC to DC converter circuit.

FIG. 7 is a block diagram of an AC to DC converter circuit according to the fourth embodiment of the invention. FIG. 8 is a wave chart describing the operations of the AC to DC converter circuit shown in FIG. 7.

The AC to DC converter circuit according to the fourth embodiment includes DC to DC converter circuits connected to the respective DC output terminal pairs of the AC to DC converter circuit shown in FIG. 1, and the output terminal pairs of the DC to DC converter circuits are connected in series to each other. The phase of the control signal fed to switching devices 22 and 23 is made to be different from the phase of the control signal fed to switching devices 24 and 25. Although ripples are caused on the voltages $v_{32}$ and $v_{33}$ of electrolytic capacitors 32 and 33, the ripples on the output voltage $v_{32}+v_{33}$ are decreased as described in FIG. 8.

The disclosure of Japanese Patent Application No. 2005-283755 filed on Sep. 29, 2005 is incorporated herein as a reference.

While the invention has been explained with reference to the specific embodiments of the invention, the explanation is illustrative and the invention is limited only by the appended claims.

What is claimed is:

1. An AC to DC converter circuit for providing at least two pairs of DC outputs from an AC power supply, comprising:
   a pair of AC input terminals;
   at least two pairs of DC output terminals including a first pair of DC output terminals and a second pair of DC output terminals;
   at least two switching devices including first and second switching devices, the at least two switching devices being connected in parallel with each other between the AC input terminals;
   first and second diodes, the first switching device being connected via the first diode between the first pair of DC output terminals, and the second switching device being connected via the second diode between the second pair of DC output terminals;
   an input voltage detector for detecting an AC voltage between the pair of AC input terminals;
   an output voltage error amplifier for detecting a DC voltage between one terminal of the first pair of DC output terminals and one terminal of the second pair of DC output terminals and outputting an error voltage based on a voltage difference between the detected DC voltage and a predetermined reference voltage; and
   a multiplier circuit for multiplying the detected AC voltage by the error voltage and outputting a control signal, wherein the at least two switching devices are controlled on the basis of the control signal.

2. The AC to DC converter circuit according to claim 1, wherein the at least two switching devices are provided with a reverse current blocking capability.

3. The AC to DC converter circuit according to claim 1, further comprising third and fourth diodes, each being connected to each of the first and second switching devices to form a series circuit connected between the AC input terminals, and one end of the series circuit being connected to each of the first and second diodes.

4. The AC to DC converter circuit according to claim 1, further comprising an input current error amplifier comparing the control signal from the multiplier circuit with an AC input current detected on one terminal of the pair of AC input terminals and generating a reference signal.

5. The AC to DC converter circuit according to claim 4, further comprising a pulse width modulator (PWM) for adjusting a pulse width of the reference signal and outputting a PWM signal.

6. The AC to DC converter circuit according to claim 5, wherein the PWM signal is supplied to gates of the at least two switching devices depending on polarity of the AC input voltage.

* * * * *